United States Patent [19]

Finkel et al.

[11] Patent Number: 4,738,901

[45] Date of Patent: Apr. 19, 1988

[54] METHOD AND APPARATUS FOR THE PREVENTION OF UNAUTHORIZED COPYING OF DOCUMENTS

[75] Inventors: Joel R. Finkel, Woodland Hills; Paul F. Jacobs, La Crescenta; Kenneth I. Gustafson, Glendora; William D. Green, Sunland, all of Calif.

[73] Assignee: Xerox Corporation, Stamford, Conn.

[21] Appl. No.: 30,530

[22] Filed: Mar. 27, 1987

Related U.S. Application Data

[62] Division of Ser. No. 868,983, May 30, 1986, Pat. No. 4,678,322.

[51] Int. Cl.⁴ .............................................. B32B 13/04

[52] U.S. Cl. .................................. 428/690; 428/537.5

[58] Field of Search ............. 428/690, 691, 917, 537.5

[56] References Cited

U.S. PATENT DOCUMENTS

| | | | |
|---|---|---|---|
| 2,822,288 | 2/1958 | Harvey et al. | 428/690 X |
| 4,442,170 | 4/1984 | Kaule et al. | 428/690 X |
| 4,451,521 | 5/1984 | Kaule et al. | 428/690 X |
| 4,451,530 | 5/1984 | Kaule et al. | 428/690 X |
| 4,452,843 | 6/1984 | Kaule et al. | 428/690 X |
| 4,627,642 | 12/1986 | Peronneau et al. | 428/690 X |
| 4,627,997 | 12/1986 | Ide | 428/690 X |

FOREIGN PATENT DOCUMENTS

| | | | |
|---|---|---|---|
| 0088700 | 5/1983 | Japan | 428/690 |
| 0052689 | 3/1984 | Japan | 428/690 |

*Primary Examiner*—Nancy A. B. Swisher
*Attorney, Agent, or Firm*—Franklyn C. Weiss

[57] ABSTRACT

Method and apparatus are disclosed for the prevention of unauthorized copying of documentation on an office, or other type, copier. Unique phosphors are applied to paper. When such a paper is placed on or in a copier so prepared, the presence of the phosphor is detected and the copier is disabled. Inside the copier a laser emits a beam toward the paper. Two detectors detect, respectively, the laser light reflected from the document and the stimulated light from the phosphor coating or layer. Detection of both signals, in the proper time sequence, will cause the photocopier to cease operation prior to electrostatic or other capture of the image. Upconversion phosphors could be utilized as the phosphor coating due to their scarcity and unliklihood of use in this manner.

1 Claim, 2 Drawing Sheets

ZERO-SAFE

A - PAPER CONTAINING PHOSPHOR
B - LASER
C - LASER EMITTED RADIATION
D - UPCONVERTED RADIATION
E - NARROWBAND FILTER AT LASER WAVELENGTH
F - DETECTOR TUNED TO THE LASER WAVELENGTH
G - NARROWBAND FILTER AT UPCONVERTED WAVELENGTH
H - DETECTOR TUNED TO THE UPCONVERTED PHOSPHOR WAVELENGTH
I - GLASS PLATEN

A - PAPER CONTAINING PHOSPHOR
B · LASER
C - LASER EMITTED RADIATION
D - UPCONVERTED RADIATION
E - NARROWBAND FILTER AT LASER WAVELENGTH
F - DETECTOR TUNED TO THE LASER WAVELENGTH
G - NARROWBAND FILTER AT UPCONVERTED WAVELENGTH
H - DETECTOR TUNED TO THE UPCONVERTED PHOSPHOR WAVELENGTH
I - GLASS PLATEN

METHOD AND APPARATUS FOR THE PREVENTION OF UNAUTHORIZED COPYING OF DOCUMENTS

This is a division of application Ser. No. 868,983 filed May 30, 1986, now U.S. Pat. No. 4,698,322.

This invention relates to the prevention of unauthorized xerographic, or other type reprographic, reproduction of classified or proprietary documents. Specific features present in such documents, are sensed which control the reprographic process by interrupting the operation of the copier.

BACKGROUND OF THE INVENTION

While document copiers have become prolific, there are certain situations where it becomes highly desirable to prevent the copying of specific originals. Such situations could occur, for example, with the illicit or unauthorized photocopying of classified or proprietary documents.

The problem of illicit photocopying of classified or proprietary documents has become pandemic. It would be highly desirable to be able to inhibit the xerographic or other type reproduction of sensitive documents. To do so requires that the photocopier be equipped with a detection and control system that will inhibit the copier automatically before the image can be captured electrostatically, unless a proper "enable" signal is received. This becomes especially important when the frequent occurrence of government espionage activities is considered in which illicit photocopies have been made of very highly classified documents. Recently, there have been a number of publicly reported cases wherein copies of information regarding battle plans fleet dispositions, communication frequencies, corporate strategies, merger plans, sales histories/forecasts, new product development reports, etc., have been sold on the open market. The ability to prevent the unauthorized photocopying of selected documents becomes extremely important to both national security and the potential future of many corporate activities and entities.

This problem can be solved by a technique which is referred to herein as the Zerosafe TM process. The technique utilizes the application of unique phosphors to paper. The phosphors may be applied either to the surface of the paper in a postproduction facility, or incorporated into the paper during the last stages of paper making. The latter technique would be preferable since it would greatly reduce the possibility of removing the phosphors without significantly damaging the paper itself.

One alternative is to utilize conventional phosphors. Another alternative utilizes what are known as upconversion phosphors. Since the upconversion phosphors are significantly less common than conventional phosphors, a Zerosafe TM implementation utilizing this approach incorporates a number of unique advantages which are discussed herein.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
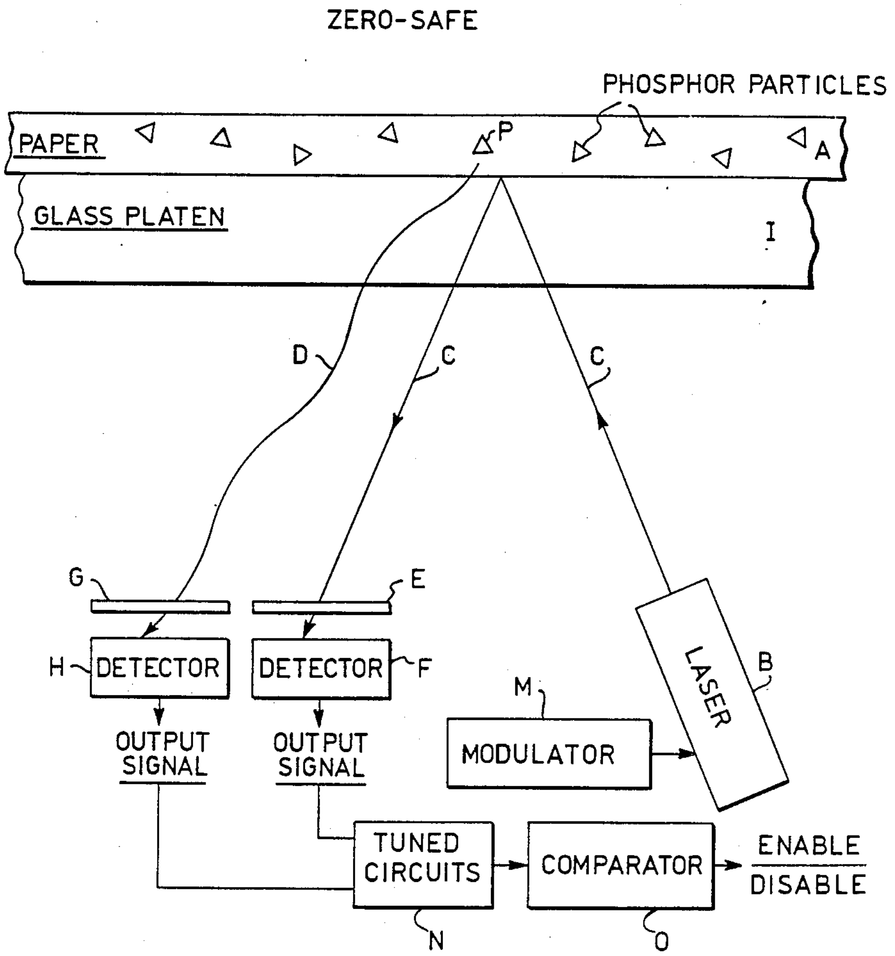
FIG. 1 is a side-view schematic representation of the present invention.

For the purposes of simplifying the present discussion, the utilization of upconversion phosphors will be described. It should be understood that the system will work equally well with the utilization of conventional phosphors. However, upconversion phosphors are much less common, and thus counterfeiting or imitation are much less likely. The basic concept, as illustrated in FIG. 1, involves the synchronous and anti-synchronous detection of radiant emissions, D, from the phosphor in the paper, A, with the detection of laser radiation, C, reflected from either the paper, A, or the glass platen, I. Detection of both signals, in the proper time sequence, will cause the photocopier to cease operation prior to electrostatic or other capture of the image. At that point, the machine would remain in a non-operative mode until it was reactivated by authorized personnel. Additional security measures could be triggered, such as operating a camera to photograph the person making the illicit photocopy, activating a man-trap, or sounding an alarm.

Upconversion phosphors are excited by low energy photons of longer wavelength and emit higher energy photons at shorter wavelengths in an anti-Stokes process.

Figure 2:
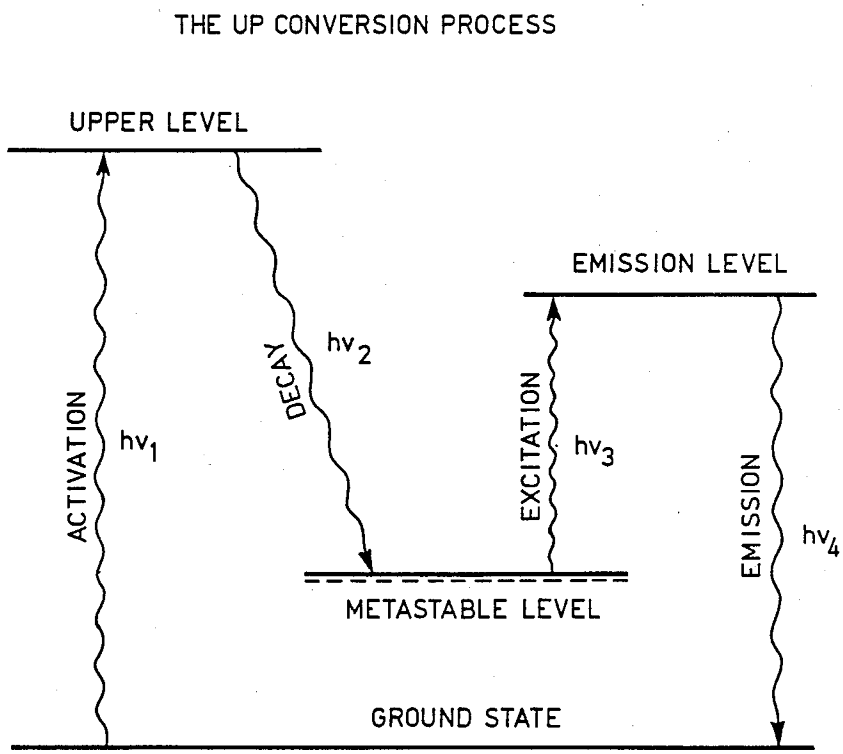
FIG. 2 is a representation of energy levels present in conjunction with the principles of the present invention.

As shown in FIG. 2, the upconversion process involves four separate steps. These are as follows:

I. Activation. A photon of energy $hv_1$ strikes the phosphor and causes an electron of one of the phosphor atoms to be elevated to an upper level excited state, as indicated in FIG. 2.

II. Spontaneous Decay. The upper level excited state rapidly decays to an intermediate metastable level (i.e. above the ground state but below the upper level) and emits a photon of energy $hv_2$. It is noted that $hv_2$ is less than $hv_1$.

III. Excitation. The metastable level may exist for quite some time. At a later time, if the electron level is further excited by a laser-emitted photon of energy $hv_3$, it will be elevated to the emission level.

IV. Emission. The emission level, not being metastable, very rapidly emits an "upconverted" photon of energy $hv_4$. It is noted that while $hv_4$ is greater than $hv_3$, which seems to violate the law of conservation of energy instantaneously, it is evident from FIG. 2 that $hv_4$ is indeed less than the sum of $hv_1$ (the original activation energy) plus $hv_3$ (the laser excitation energy). Therefore, the overall upconversion process does not violate conservation of energy.

There are relatively few upconversion phosphors. These are usually inorganic chemical compounds, although a few organic materials can function in a similar manner. Conversely, there are a great many conventional phosphors both organic and inorganic.

If a conventional phosphor were to be used, it would probably best be activated by energy from one or more of the lines emitted by a mercury arc lamp located within the copier. The mercury lamp would be positioned to avoid interference with the proper operation of the copier. The conventional phosphors would emit energy in a portion of the visual spectrum that is well separated in wavelength from the output of the mercury source itself.

In all cases, the proposed system depends upon the detection of radiation emitted from an upconversion or conventional phosphor, applied in an unobtrusive manner onto, or into, the paper of special documents which are not to be copied. As mentioned previously, the optimum method of introducing these phosphors into the paper would be during the paper making process. As an alternative, special paper could be precoated with phosphors in a transparent and unobtrusive vehicle. This latter technique may be more susceptible to removal of material or other forms of system compromise.

The upconversion phosphor in or on the paper is stimulated to emit light of a shorter, more energetic wavelength than the light of the source. An infrared light source such as a gallium aluminum arsenide (GaAlAs) laser, a gallium arsenide (GaAs) laser, or other appropriate narrow band infrared source can be used to excite the upconversion process.

Referring again to FIG. 1, all of the wavelengths involved must be capable of transmission through the platen, I, of the copier machine that separates the paper, A, from the illuminating and reprographic sections of the machine. When the laser radiation, C, and the upconversion phosphor radiation, D, pass through the platen, I, from the illuminated paper, A, they are detected by appropriately filtered sensors, F and H, respectively. If only radiation C, having the wavelength of the excitation laser, is sensed by detector F, due to reflection off the paper or platen, absolutely nothing happens to interrupt the reprographic machine. However, if wavelength D, associated with the phosphor, is also sensed by detector H, in the same time sequence as radiation C is received by detector F, then the reprographic machine is interrupted prior to the electrostatic capture of an image. The machine remains in a nonoperative mode until such time as it is reset by the appropriate authorities.

The wavelength of the applied radiation is sensed by means of a combination of narrow band interference filters, E and G, placed before detectors F and H respectively. The filters could be positioned directly upon the surfaces of individual detectors or they could be located separately on a single, split-surface, two-part photodetector. The use of two discrete wavelength filter/detector combinations permits the machine to differentiate between the reflected, laser excitation radiation C and the emitted, upconversion radiation D. The two radiation signals are are then compared in the time domain through the use of coincidence and anti-coincidence comparator circuits. If the laser excitation radiation is produced in a time coded pulse train, then the radiation emitted by the phosphor must also be detected in the same time coded pulse sequence. This technique, involving time coded signals, will eliminate the problem of random radiation received at the emission detector from various background sources. This time domain pulsing may be obtained either by mechanical chopping of the excitation wavelength or by electronic modulation of the driver circuit utilized to operate the IR laser.

No matter how the Zerosafe optical interference filters E, G, and photodetectors F, H are arranged in the copier, the detection of the laser excitation wavelength, but not the phosphor emission wavelength, will cause an "enable" signal to be sent to the copier's electronic control system. However, if radiation at the wavelength of the emission from the upconversion phosphor is also sensed, and the time coded pulse sequences are identical to those of the laser radiation, then the processing circuitry would send an overriding "disable" signal to the copier's control system. The copier would then be inhibited until reset by the proper authorities.

It is likely that there will be some continuous wavelength radiation components present in ambient light that could confuse the system. In order to avoid this problem with the Zerosafe control circuitry, the output signal from the laser B source will be pulse coded by either mechanical or electronic modulation. Electronic modulation M would be the more desirable method, but either technique would be acceptable. Tuned circuits in the detector amplifier N would match the output signals. When using an upconversion phosphor excited by a laser diode B, electronic digital modulation of the laser driver circuit would be used.

In one particular embodiment, involving the upconversion method, a silver or copper and cobalt activated zinc sulfide phosphor P would emit in the yellow region of the visible spectrum when excited by radiation at approximately 820 nanometer (nm) wavelength from a gallium aluminum arsenide (GaAlAs) laser diode. The emission from the upconversion phosphor in this instance occurs at approximately 575 nm. An optical interference filter G designed to pass light at 575 nm would be situated immediately in front of photodetector, H, (typically a silicon PIN photodetector). The laser drive circuit would be operated in a digitally encoded manner. When an illicit copy was being attempted, the signal received at photodetector H would be modulated in the same digitally encoded manner as the signal at photodetector F, which has been filtered to receive the laser excitation wavelength. The output signals of both the laser wavelength detector F and the phosphor emission wavelength detector H would then be fed through tuned circuits N into a comparator O. The two signals will correspond if the pulsed optical signal received from the phosphor has the same code as the pulsed output from the laser source. If either signal results from stray ambient light, the photodetector output will not pass the decoding circuit, the comparator output will be negative, and an "enable" signal will be inputted to the copier control circuit, allowing the system to continue reprographic operation. If, on the other hand, the received phosphor emission signal is modulated in the same way as the laser excitation signal, then the output from the photodetector will pass through the decoder circuit and cause the comparator to issue a "disable" control signal to the copier, shutting it down.

While upconversion phosphors are preferred, due to their relative unavailability and difficulty of detection and counteraction, conventional phosphors might be utilized. These phosphors can be excited by a mercury vapor light source such as an Ultra-Violet Products Pen-Ray Lamp, Model 11SC-1L. The 11SC-1L is suggested because it produces a significant percentage of its radiant output at or near the 365 nm wavelength region rather then the conventional 253.4 nm mercury resonance line. This is advantageous since the lower wavelength mercury radiation is not transmitted through the glass commonly used for the platens in most reprographic copiers. Furthermore, the 365 nm radiation couples rather readily into numerous conventional phosphors such as the Sylvania 7100. Greater care would have to be utilized with conventional phosphors, in the selection and matching of the excitation wavelength and the emission wavelength. This would be necessary to assure maximum energy coupling into the phosphor to achieve the most energic phosphor outputs possible, and to select phosphor output wavelengths which do not coincide with background wavelengths that might otherwise interefere with system operation. This is especially important since a system with conventional phosphors will be more difficult to modulate electronically. Thus, mechanical chopping may be necessary for the conventional phosphor approach because of the nature of the mercury light source.

There are several other possible embodiments of the proposed system that should become obvious to those skilled in the art once they have been able to comprehend the above system description. All of these other potential embodiments depend to some extent upon the excitation of a signal emitted from a chemical coating on or in a sheet of paper or other medium to be reproduced xerographically. Detection of the signal would be used to disable a reprographic machine and prevent the copying of that particular item until some intervening action has been taken by an appropriate authority.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A document stock for use in preventing the copying thereof in an office copier or the like comprising:

a standard paper substrate, and phosphorescent material on or in said paper substrate, said phosphorescent material emitting radiant energy upon being stimulated by a separate beam of light, wherein said layer of phosphorescent material is an upconversion phosphor which emits light of a higher energy level than that exciting it.

* * * * *